US012498976B2

(12) United States Patent
Olson et al.

(10) Patent No.: US 12,498,976 B2
(45) Date of Patent: Dec. 16, 2025

(54) DATA STORAGE

(71) Applicant: Arm Limited, Cambridge (GB)

(72) Inventors: Jens Olson, San Jose, CA (US); John Wakefield Brothers, III, Calistoga, CA (US)

(73) Assignee: Arm Limited, Cambridge (GB)

( * ) Notice: Subject to any disclaimer, the term of this patent is extended or adjusted under 35 U.S.C. 154(b) by 565 days.

(21) Appl. No.: 17/967,297

(22) Filed: Oct. 17, 2022

(65) Prior Publication Data
US 2024/0126602 A1 Apr. 18, 2024

(51) Int. Cl.
*G06F 9/50* (2006.01)
(52) U.S. Cl.
CPC .................. *G06F 9/5016* (2013.01)
(58) Field of Classification Search
CPC .................................... G06F 9/5016
See application file for complete search history.

(56) References Cited

U.S. PATENT DOCUMENTS

2022/0398025 A1\* 12/2022 Kotwal ............... G06F 3/061
2023/0059820 A1\* 2/2023 Gissin ............... G06F 9/5016

OTHER PUBLICATIONS

Ballester-Ripoll, Rafael, Peter Lindstrom, and Renato Pajarola. "TTHRESH: Tensor compression for multidimensional visual data." IEEE transactions on visualization and computer graphics 26.9 (2019): 2891-2903. (Year: 2019).\*

\* cited by examiner

*Primary Examiner* — Charlie Sun
(74) *Attorney, Agent, or Firm* — EIP US LLP

(57) ABSTRACT

A processor to execute a plurality of tasks comprising a first task and a second task. At least a part of the first task is to be executed simultaneously with at least a part of the second task. The processor comprises a handling unit to: determine an available portion of a storage available during execution of the part of the first task; determine a mapping between at least one logical address associated with data associated with the part of the second task and a corresponding at least one physical address of the storage corresponding to the available portion; and identify, based on the mapping, the at least one physical address corresponding to the at least one logical address associated with the data, for storing the data in the available portion of the storage.

20 Claims, 3 Drawing Sheets

DATA STORAGE

BACKGROUND

Technical Field

The present invention relates to methods, processors, and non-transitory computer-readable storage media for handling the usage of storage for storing data.

Description of the Related Technology

Certain data processing techniques, such as neural network processing and graphics processing, involve the processing and generation of considerable amounts of data. It is desirable to efficiently handle storage of and access to data associated with data-intensive processing techniques such as these.

SUMMARY

According to a first aspect of the present invention there is provided a processor to execute a plurality of tasks, the plurality of tasks comprising a first task; and a second task, wherein at least a part of the first task is to be executed simultaneously with at least a part of the second task, the processor comprising: a handling unit to: determine an available portion of a storage available during execution of the part of the first task; determine a mapping between at least one logical address associated with data associated with execution of the part of the second task and a corresponding at least one physical address of the storage corresponding to the available portion; and identify, based on the mapping, the at least one physical address corresponding to the at least one logical address associated with the data, for storing the data in the available portion of the storage.

According to a second aspect of the present invention there is provided a method performed by a processor, the method comprising: determining an available portion of a storage available during execution of a part of a first task; determining a mapping between at least one logical address associated with data associated with execution of a part of a second task and a corresponding at least one physical address of the storage corresponding to the available portion, wherein at least the part of the first task is to be executed simultaneously with at least the part of the second task; and identifying, based on the mapping, the at least one physical address corresponding to the at least one logical address associated with the data, for storing the data in the available portion of the storage. As explained with reference to the first aspect, this for example reduces idle time of the processor, allowing the tasks to be performed more efficiently and with reduced storage size compared to other approaches.

According to a third aspect of the present invention there is provided a non-transitory computer-readable storage medium comprising a set of computer-readable instructions stored thereon which, when executed by at least one processor, are arranged to cause the at least one processor to: determine an available portion of a storage available during execution of a part of a first task, wherein the storage is accessible to the at least one processor; determine a mapping between at least one logical address associated with data associated with execution of a part of a second task and a corresponding at least one physical address of the storage corresponding to the available portion, wherein at least the part of the first task is to be executed simultaneously with at least the part of the second task; and identify, based on the mapping, the at least one physical address corresponding to the at least one logical address associated with the data, for storing the data in the available portion of the storage. As explained with reference to the first and second aspects, this for example reduces idle time of the at least one processor, allowing the tasks to be performed more efficiently and with reduced storage size compared to other approaches.

BRIEF DESCRIPTION OF THE DRAWINGS

Further features will become apparent from the following description of examples, which is made with reference to the accompanying drawings.

DETAILED DESCRIPTION

Figure 1A:
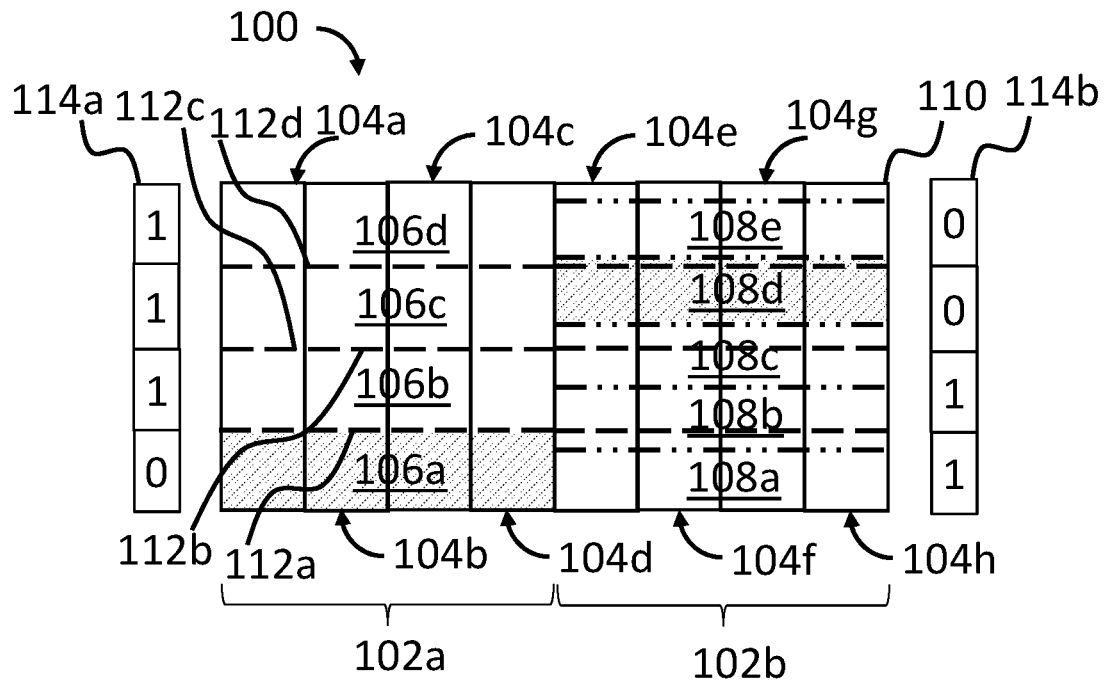
FIGS. 1a and 1b are schematic representations of usage of storage to store data generated during execution of first and second tasks respectively, according to examples.

First examples herein relate to a processor comprising a handling unit to identify an available portion of a storage, which is available during execution of a part of a first task, for use in storing data associated with a part of a second task, such as data generated or read during execution of the part of the second task. In examples, the handling unit determines a mapping between at least one logical address associated with the data and a corresponding at least one physical address of the storage, corresponding to the available portion.

With this approach, the processor need not wait until execution of one task has finished before starting another task. Instead, tasks can be overlapped, meaning that multiple tasks can be performed at the same time as each other. The data associated with different tasks can be stored in different parts of the storage at the same time, for example to avoid overwriting data from one task with subsequent data generated by execution of a subsequent task. In other words, the storage can be remapped dynamically between a first task and a second task, for example to use the first part of the storage that becomes free during execution of the first task to store data generated during execution of the second task. This can for example reduce idle time of the processor. Moreover, this for example improves the efficiency with which the storage is used, allowing a smaller storage to be provided than with other approaches. For example, the storage may be local storage of the processor, which may be relatively small.

The part of the first task may be an end of the first task and the part of the second task may be a beginning of the second task. In other words, the processor can for example perform address remapping between successive tasks. This may be sufficient to avoid delays between successive operations in a processing pipeline while allowing the mapping to be determined relatively straightforwardly.

The storage may comprise a plurality of pre-defined portions, and the handling unit may determine which of the pre-defined portions is available for use as the available portion based on availability data indicative of an availability of each of the plurality of pre-defined portions during execution of the part of the first task. This for example allows the mapping to be determined straightforwardly. For example, the availability data may represent a binary value for each of the pre-defined portions, indicating whether a given pre-defined portion is available (e.g. taking the value 1) or unavailable (e.g. taking the value 0) during execution of the part of the first task. In such cases, the storage may comprise a plurality of storage units, and each of the plurality of pre-defined portions may correspond to a respective range of physical addresses of a set of the storage units. Allocating the pre-defined portions in this manner is for example relatively simple, and allows data to be stored in a pre-defined portion spanning a set of storage units. The available portion in which the data is stored may correspond to a first range of physical addresses for a first set of the storage units and a second range of physical addresses, different from the first range of physical addresses, for a second set of the storage units, different from the first set of the storage units. In this way, the storage can be divided in a flexible manner to optimize usage of the storage and reduce idle time of the processor that may otherwise occur if the processor is to wait for the same physical address for each set of storage units to become free for storage of the data. In some cases, the at least one physical address may correspond to less than all of at least one of the pre-defined portions. This for example provides for further flexibility as the data need not be the same size as a pre-defined portion to be stored in the storage. Instead, the data may occupy part of a pre-defined portion, allowing the data to be stored in the storage as processing is ongoing, e.g. even if the data is not yet of a sufficient size to entirely fill a pre-defined portion.

The mapping may be further based on a task identifier associated with the data, indicative of which task the data is associated with. For example, for data generated during execution of part of the second task, the task identifier may indicate that the data is associated with the second task. Use of a task identifier such as this for example facilitates tracking of mappings used for different tasks by the handling unit. For example, the handling unit may perform the mapping for logical addresses of data associated with the second task, based on the task identifier indicating that the data is indeed associated with the second task. In contrast, the handling unit may determine not to perform the mapping for data associated with the first task, which may be associated with a task identifier indicative that this data is associated with the first task.

The first task may comprise a first set of operations, the second task may comprise a second set of operations, and at least one of the first set of operations and the second set of operations may comprise at least two operations to be executed simultaneously by the processor. This can further improve efficiency. For example, data generated by performing the two operations can be stored in a non-overlapping manner, e.g. using the mapping described herein, to allow the two operations to be executed at the same time. For example, the handling unit may segment the storage to store a respective output of each of the at least two operations in different respective segments of the storage. In such cases, the available portion may comprise a respective part of each of the segments of the storage, allowing the storage to be used flexibly to improve utilization of the storage.

The data may represent at least part of a multi-dimensional tensor. A multi-dimensional tensor can be used in various different computationally intensive processes, such as neural network processing and graphics processing. Thus, the methods herein can for example be used to improve the efficiency with which such processes are performed, by allowing at least two tasks to be performed at least partly simultaneously. In these examples, the processor may comprise a neural engine to process at least the part of the multi-dimensional tensor. The storage may be storage of the processor, such as local storage of the neural engine. This for example reduces the bandwidth in the processing of the multi-dimensional tensor by the neural engine, by reducing external memory accesses. This for example allows the processing performed by the neural engine to be performed more efficiently.

In examples in which the processor comprises a neural engine and the storage is local storage of the neural engine, the processor may further comprise a graphics processor to undertake at least a portion of a graphics processing operation forming one of a set of pre-defined graphics processing operations which collectively enable an implementation of a graphics processing pipeline. Such a processor for example enables the issuance of tasks to different processing modules, which are optimized for performance of a given task type. For example, neural processing tasks can be issued to the neural engine and graphics processing tasks can be issued to the graphics processor. This can improve the efficiency and resource usage of the processor and can reduce component size.

In some examples, the handling unit is to toggle between use of at least primary control logic and secondary control logic for determining an available portion of the storage over time, wherein the primary control logic is associated with a primary task and is indicative of a first usage of the storage during execution of at least part of the primary task, and the secondary control logic is associated with a secondary task to be executed at least partly simultaneously with the primary task and is indicative of a second usage of the storage during execution of at least part of the secondary task. In other words, there may be at least two copies of control logic (e.g. at least primary and secondary control logic) in order to keep track of usage of the storage by a plurality of tasks at the same time (e.g. at least primary and secondary tasks, which may be the first and second tasks discussed in other examples herein). For example, the primary and secondary tasks may be associated, respectively, with a first and second segmentation of the storage into at least one segment and, in some cases, of the at least one segment into buffer(s). As execution of a given task continues over time, the usage of the storage to store data associated with the given task, such as data read by or generated by the task, may vary over time. The control logic for a particular task may be used to track how the storage is used by that task over time, and may e.g. include pointers to physical addresses in the storage corresponding to respective buffers for a given segment. The control logic may further include status indicators for respective portions of the storage, such as respective buffers or sets of buffers, e.g. indicating whether there is at least one buffer in a given segment that is free to be written to or ready to be read from, or indicating whether a particular buffer is free to be written to, ready to be read from, or in process (e.g. currently or about to be in use). The handling unit can thus use the control logic for tasks that are to be executed at least partly simultaneously to easily determine which portions of the storage are available at a given time.

According to second examples, there is provided a method, performed by a processor. The method comprises determining an available portion of a storage, which is available during execution of a part of a first task, for use in storing data associated with a part of a second task. A mapping is determined between at least one logical address associated with the data and a corresponding at least one physical address of the storage corresponding to the available portion. This allows the data to be stored in the available portion of the storage. As explained with reference to the first examples, this for example reduces idle time of the processor, allowing the tasks to be performed more efficiently and with reduced storage size compared to other approaches.

The part of the first task may be an end of the first task and the part of the second task may be a beginning of the second task. This can for example reduce delays between successive tasks and for example facilitates the straightforward determination of the mapping.

The storage may comprise a plurality of pre-defined portions, and the method may comprise determining which of the pre-defined portions is available for use as the available portion based on availability data indicative of an availability of each of the plurality of pre-defined portions during execution of the first part of the first task. This for example allows the mapping to be determined in a simple and efficient manner.

Each of the plurality of pre-defined portions may correspond to a respective range of physical addresses of a set of the storage units. The available portion may correspond to a first range of physical addresses for a first set of the storage units and a second range of physical addresses, different from the first range of physical addresses, for a second set of the storage units, different from the first set of the storage units. As explained with respect to the first aspect, these approaches for example further simplify the determination of the mapping, and can provide for efficient usage of the storage.

According to third examples, there is provided a non-transitory computer-readable storage medium comprising a set of computer-readable instructions stored thereon which, when executed by at least one processor, are arranged to cause the at least one processor to execute any aspects in accordance with the first and/or second examples. In this way, idle time of the at least one processor can for example be reduced, allowing the tasks to be performed more efficiently and with reduced storage size compared to other approaches. For example, the storage may comprise a plurality of pre-defined portions and the set of computer-readable instructions stored thereon may be arranged to, when executed by at least one processor, cause the at least one processor to determine which of the pre-defined portions is available for use as the available portion based on availability data indicative of an availability of each of the plurality of pre-defined portions during execution of the part of the first task. This for example simplifies the identification of the available portion of the storage.

Figure 1B:
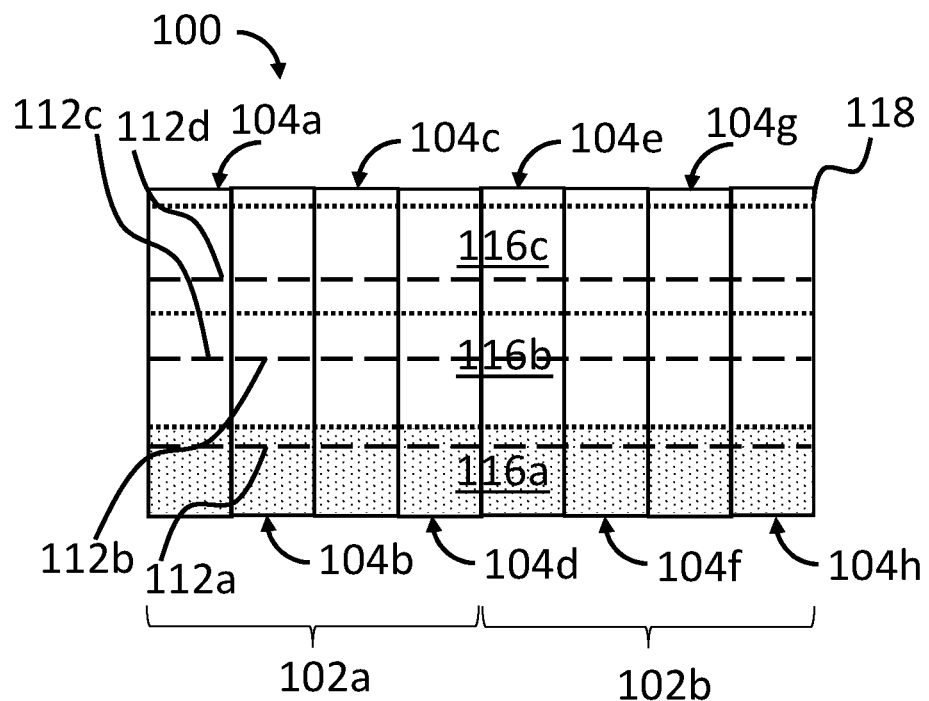

To illustrate these examples, FIGS. 1*a* and 1*b* show schematically the usage of storage 100 to store data generated during execution of first and second tasks respectively. FIG. 1*a* shows the use of the storage 100 at a first time to store the data generated during execution of a part of the first task (which, in this example, is an end of the first task). In this example, the storage 100 includes two sets 102*a*, 102*b* of storage units, which in this example are memory banks. The first set 102*a* of storage units includes four memory banks 104*a*-104*d* and the second set 102*b* of storage units includes a further four memory banks 104*e*-104*h* (shown as columns in FIG. 1*a*) in this example. However, in other examples, a set of storage units may include more or fewer memory banks or a storage unit may be a different element than a memory bank. In this example, each memory bank 104*a*-104*h* includes 256 physical addresses (from 0 to 255) corresponding to 256 different physical storage locations within the storage 100, per memory bank 104*a*-104*h*.

In the example of FIG. 1*a*, the first task includes a first set of operations, which in this example is two operations. Each operation for example receives an input with predetermined input characteristics and produces an output having known output characteristics. In other words, each operation is predefined. For example, an operation may implement a layer of processing of a predefined neural network, in which a feature map is convolved with neural network weights. The storage 100 can for example be segmented appropriately to facilitate efficient performing of the set of operations for a given task. In some cases, an output of an operation may be provided as an input to another operation. However, in the example of FIG. 1*a*, the two operations of the first task are independent of each other. This allows the operations to be executed simultaneously.

In this example, the storage 100 is segmented to store an output of one of the operations in the first set 102*a* of storage units (i.e. memory banks 104*a*-104*d*), and to store an output of the other one of the operations in the second set 102*b* of storage units (i.e. memory banks 104*e*-104*h*). The storage 100 in this example has two segments for execution of the first task: a first segment corresponding to the first set 102*a* of storage units and a second segment corresponding to the second set 102*b* of storage units. In other examples, though, a plurality of segments may be associated with a single operation and/or a storage may be segmented into more or fewer segments. Furthermore, a segment may span a plurality of sets of memory banks or a single set of memory banks.

Each segment is further divided into a plurality of storage areas in the example of FIGS. 1*a* and 1*b*. Each storage area for example occupies the same range of physical addresses for each storage unit within the set of storage units. In other words, a first storage area may occupy the same range of physical addresses for each storage unit of a given set of storage units (e.g. for each memory bank 104*a*-104*d* of the first set 102*a* of storage units, or for each memory bank 104*e*-104*h* of the second set 102*b* of storage units). However, a first storage area may occupy a different range of physical addresses for storage units in a different set of storage units. In other words, the first storage area may occupy a different range of physical addresses for the memory banks 104*a*-104*d* of the first set 102*a* of storage units than for the memory banks 104*e*-104*h* of the second set 102*b* of storage units. With the storage 100 having a plurality of sets of storage units, the identification of an available portion of the storage 100 can for example be identified straightforwardly, e.g. per set of storage units, for example under the assumption that a storage area for a given set of storage units corresponds to the same range of physical addresses for each storage unit of the set.

Each storage area in this example may be considered to be a buffer for storing data generated by execution of at least part of the operation associated with the segment comprising the buffer. For example, in FIG. 1*a*, the first segment (corresponding to the first set 102*a* of storage units) is divided into four buffers 106*a*-106*d*. The second segment (corresponding to the second set 102*b* of storage units) is divided into five buffers 108*a*-108*e*. In this example, each buffer of a given segment is the same size as each other buffer of that segment, but this need not be the case in other examples. In FIG. 1*a*, the combined size of the buffers 108a-108e is slightly less than the total size of the second segment, so the second segment also includes an unused storage area 110, which is not used to store data during execution of the first task.

Each of the buffers 106a-106d of the first segment are allocated for storing data generated during performance of the first operation and each of the buffers 108a-108e of the second segment are allocated for storing data generated during performance of the second operation. Each buffer corresponds to a different set of physical addresses of the storage 100, but so that a given buffer occupies the same physical addresses for each memory bank of a particular segment (although this need not be the case in other examples). In FIG. 1a, the first buffer 106a of the first segment corresponds to physical addresses 0 to 63 in the memory banks 104a-104d of the first segment, the second buffer 106b of the first segment corresponds to physical addresses 64 to 127 in the memory banks 104a-104d of the first segment, the third buffer 106c of the first segment corresponds to physical addresses 128 to 195 in the memory banks 104a-104d of the first segment and the fourth buffer 106d of the first segment corresponds to physical addresses 196 to 255 in the memory banks 104a-104d of the first segment. An extent of each of the buffers 106a-106d of the first segment is indicated with a dashed line in FIG. 1a.

Similarly, the first buffer 108a of the second segment corresponds to physical addresses 0 to 47 in the memory banks 104e-104h of the second segment, the second buffer 108b of the second segment corresponds to physical addresses 48 to 95 in the memory banks 104e-104h of the second segment, the third buffer 108c of the second segment corresponds to physical addresses 96 to 143 in the memory banks 104e-104h of the second segment, the fourth buffer 108d of the second segment corresponds to physical addresses 144 to 191 in the memory banks 104e-104h of the second segment, the fifth buffer 108e of the second segment corresponds to physical addresses 192 to 239 in the memory banks 104e-104h of the second segment. The unused storage area 110 of the second segment corresponds to physical addresses 240 to 255 in the memory banks 104e-104h of the second segment. An extent of each the buffers 108a-108e and unused storage area 110 of the second segment is indicated with a dash-dot-dot line in FIG. 1a.

In FIG. 1a, during execution of an end of the first task, the first buffer 106a of the first segment and the fourth buffer 108d of the second segment are in use (indicated by diagonal line shading in FIG. 1a) to store the data generated by execution of the end of the first task. The remainder of the storage 100 is not in use. However, this is merely an example, and in other cases a greater proportion of the storage 100 may be in use during execution of a given task and/or at least one set of storage units (corresponding to a segment) may be entirely free during execution of a task or a part of a task.

In this example, the second to fourth buffers 106b-106d of the first segment and the first to third buffer 108a-108c, the fifth buffer 108e and the unused storage area 110 of the second segment are not in use during the execution of the end of the first task, and are thus available to store other data, such as data generated during execution of part of a second task which is to executed at the same time as the end of the first task.

The extent of the buffers of a given segment may depend on the task being executed by the processor, and can vary dynamically in this example. For example, the size of the buffers may change from task to task depending on the processing involved in the task, to provide buffers of an appropriate size to store data generated during execution of a particular task in an efficient manner. Given this, it can be more straightforward to indicate which of a plurality of pre-defined portions of the storage 100 are available for storing data, rather than indicating which of a variable number of buffers are available. For example, the pre-defined portions may be defined prior to execution of a first task, and may remain the same during execution of a plurality of tasks, in contrast to the buffers, which typically vary in size and number depending on the task at hand.

In the example of FIG. 1a, the storage 100 includes four pre-defined portions for each segment (i.e. for each set 102a, 102b of storage units in this example). The pre-defined portions may be considered to correspond to quadrants in this case. The extent of the pre-defined portions is indicated in FIG. 1a by the dashed lines 112a-112d.

In FIG. 1a, the pre-defined portions are the same size as the buffers 106a-106d of the first segment, but this is merely an example. Hence, in this example, a first pre-defined portion of the first segment (corresponding to physical addresses 0 to 63 in the memory banks 104a-104d of the first segment) is unavailable while the end of the first task is being executed. However, second to fourth pre-defined portions of the first segment (corresponding to physical addresses 64 to 127, 128 to 191, and 192 to 255 respectively in the memory banks 104a-104d of the first segment) are available. In FIG. 1a, the availability of each of the pre-defined portions of the storage 100 during execution of the end of the first task is indicated by availability data 114a, 114b for each segment. In this example, the availability data 114a, 114b indicates whether a given pre-defined portion is available by a binary value: a value of 0 indicates that a portion is unavailable and a value of 1 indicates that a portion is available during execution of the end of the first task. Hence, in this case, the availability data 114a for the first segment indicates that the first pre-defined portion is unavailable (with a value of 0), and that the second to fourth pre-defined portions are available (with a value of 1) during execution of the end of the first task.

The pre-defined portions in FIG. 1a differ in size from the buffers 108a-108e and the unused storage area 110 of the second segment. The first to fourth pre-defined portions for the second segment correspond to physical addresses 64 to 127, 128 to 191, and 192 to 255 respectively in the memory banks 104e-104h of the second segment. In this example, the first buffer 108a occupies solely the first pre-defined portion, the second buffer 108b occupies part of the first and second pre-defined portions, the third buffer 108c occupies part of the second and third pre-defined portions, the fourth buffer 108d occupies part of the third and fourth pre-defined portions and the fifth buffer 108e and unused storage area 110 occupy solely the fourth pre-defined portions. Hence, in this example, with the fourth buffer 108d of the second segment in use and the remainder of the second segment available during execution of the end of the first task, the availability data 114b for the second segment indicates that the first and second pre-defined portions are available (with a value of 1) and the third and fourth pre-defined portions are unavailable (with a value of 0). In other words, even if a pre-defined portion is only partly occupied, it is marked as unavailable in this scheme, to simplify the identification of available portions of the storage 100.

Turning now to FIG. 1b, FIG. 1b shows schematically the same storage 100 as that shown in FIG. 1a, but at a second time, during execution of a beginning of a second task. FIG. 1b shows how the data generated during execution of the beginning of the second task could be stored in the storage 100 if the second task were performed after the first task had finished (i.e. once the entirety of the storage 100 is available). Like reference numerals indicate like elements in FIGS. 1a and 1b; the same descriptions are to be taken to apply.

The second task in the example of FIG. 1b involves a single operation. In this example, the storage 100 still includes a first set 102a of storage units (memory banks 104a-104d) and a second set 102b of storage units (memory banks 104e-104h). However, the storage 100 now has a single segment corresponding to the single operation. The single segment corresponds to a combination of the first and second sets 102a, 102b of storage units in FIG. 1b. However, in other examples, there may be a different association between sets of storage units of the storage 100 and segments.

For execution of the beginning of the second task the storage 100 is divided into a plurality of storage areas, in this case three buffers 116a-116c. An extent of each of the buffers 116a-116c is indicated by a dotted line in FIG. 1b. The first buffer 116a corresponds to physical addresses 0 to 79 in each of the memory banks 104a-104h, the second buffer 116b corresponds to physical addresses 80 to 159 in each of the memory banks 104a-104h and the third buffer 116c corresponds to physical addresses 160 to 239 in each of the memory banks 104a-104h. The storage 100 also includes an unused storage area 118 corresponding to physical addresses 240 to 255 in each of the memory banks 104a-104h. In this example, the beginning of the second task involves the generation of data to be stored in the first buffer 116a (indicated by dotted shading) and the remainder of the storage 100 is available.

As can be seen from a comparison between FIGS. 1a and 1b, with the storage 100 allocated as shown in FIGS. 1a and 1b it would not be possible to execute the beginning of the second task until the end of the first task is complete, as the beginning of the second task requires the use of physical addresses that are occupied during execution of the end of the first task (the physical addresses corresponding to the first buffer 106a of the first set 102a of storage units shown in FIG. 1a). This would therefore introduce a delay in the processing pipeline.

Figure 2:
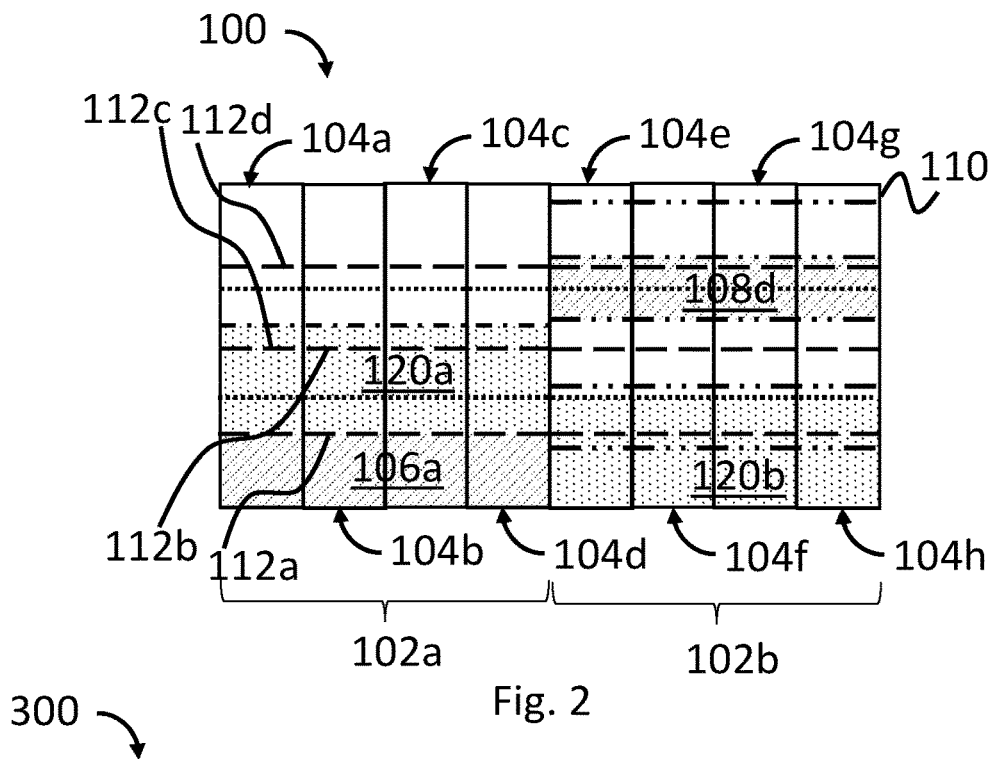
FIG. 2 is a schematic representation of usage of storage to simultaneously store data generated during execution of the first and second tasks of FIGS. 1a and 1b, according to examples.

To reduce or remove a delay such as this, the logical addresses associated with the data generated during execution of the part of the second task which is to be performed at the same time as a part of the first task are remapped to physical addresses corresponding to an available portion of the storage according to examples herein. This is shown in FIG. 2, which shows use of the storage 100 of FIGS. 1a and 1b to simultaneously store data associated with the end of the first task and data associated with the beginning of the second task. Like reference numerals indicate like elements in FIGS. 1a, 1b and 2; the same descriptions are to be taken to apply.

In FIG. 2, the storage 100 includes first and second sets 102a, 102b of storage units as shown in FIGS. 1a and 1b. The data generated during the execution of the end of the first task is stored in a first buffer 106a of the first set 102a of memory banks 104a-104d and in a fourth buffer 108d of the second set 102b of memory banks 104e-104h. These buffers have the same respective extent as the first buffer 106a of the first segment and the fourth buffer 108d of the second segment of FIG. 1a, and are hence labelled with the same labels and reference numerals in FIG. 2. In FIG. 2, dash-dot-dot lines are also used to indicate an extent of the buffers of the second segment of FIG. 1a with respect to the storage 100 and dotted lines are used to indicate an extent of the buffers of the single segment of FIG. 1b with respect to the storage 100.

The storage 100 of FIG. 2 has the same four pre-defined portions per set of memory banks as shown in FIGS. 1a and 1b, an extent of which is indicated by dashed lines 112a-112d. As explained with reference to FIG. 1a, during execution of the end of the first task, the physical addresses corresponding to the second to fourth pre-defined portions of the first segment (addresses 64 to 255 of each memory bank 104a-104d of the first set 102a of storage units) and the physical addresses corresponding to the first and second pre-defined portions of the second segment (addresses 0 to 127 of each memory bank 104e-104h of the second set 102b of storage units) are available. These physical addresses therefore correspond to an available portion of the storage 100.

In this case, logical addresses associated with the data generated during execution of the beginning of the second task are mapped to physical addresses corresponding to the available portion. However, some of the logical addresses associated with this data may already be associated with available physical addresses. These logical addresses thus need not be mapped to a different physical address. For example, physical addresses of 0 to 79 within the memory banks 104e-104h of the second set 102b of storage units are available during execution of the beginning of the second task. Hence, data generated during execution of the beginning of the second task with logical addresses corresponding to these physical addresses are stored in these physical addresses, without mapping these logical addresses to different physical addresses.

In contrast, data generated during execution of the beginning of the second task with a logical address corresponding to a physical address of 0 to 79 within the memory banks 104a-104d of the first set 102a of storage units cannot be stored in these memory banks because they are already partly occupied by the data generated during execution of the end of the first task (in the first buffer 106a of the first set 102a of storage units). Hence, these logical addresses are mapped to different physical addresses, which are available during execution of the end of the first task. In this case, these logical addresses are mapped to the physical addresses of 64 to 143 within the memory banks 104a-104d of the first set 102a of storage units. The data generated during execution of the beginning of the second task is thus stored partly in a first range of physical addresses in the first set 102a of storage units, which in this case is from 64 to 143, and partly in a second, different, range of physical addresses in the second set 102b of storage units, which in this case is from 0 to 79. In other words, the data may be stored at different physical addresses in different respective sets of storage units. In this example, the segment for the second task, which in this case is arranged to store an output of the single operation of the second task, spans both sets 102a, 102b of storage units. The physical locations corresponding to a combination of the first range of physical addresses in the first set 102a of storage units and the second range of physical addresses in the second set 102b of storage units may together be taken to correspond to a buffer of the segment.

In the example of FIG. 2, the mapping is performed per set of storage units. This for example reduces the processing involved to calculate the mapping compared to performing a mapping on a per storage unit basis. In this example, logical addresses associated with the first set of storage units undergo a mapping, so that the logical addresses which would be associated with physical addresses in the first pre-defined portion are mapped to physical addresses in an available portion of the first set of storage units. However, logical addresses associated with the second set of storage units are not mapped to different physical addresses in this example, as the logical addresses associated with the data generated during execution of the beginning of the second task already occupy available pre-defined portions of the second set of storage units.

As can be seen in FIG. 2, the data stored in the storage 100 after mapping need not occupy all of a pre-defined portion. For example, in FIG. 2, the first part 120a of the first set 102a of storage units for storing part of the data generated during execution of the beginning of the second task corresponds to a combination of the second pre-defined portion of the first set 102a of storage units and part of the third pre-defined portion of the first set 102a of storage units.

In some cases, a given logical address may be mapped to a physical address corresponding to a start of a pre-defined portion. For example, a logical address that, prior to mapping, corresponds to a physical address of 0 within a storage unit, may be mapped to a physical address corresponding to a start of a pre-defined portion such as a physical address of 0, 64, 128 or 196 within a storage unit in the example of FIGS. 1a, 1b and 2.

In some examples, the mapping is based on a task identifier associated with the data, indicative that the data is associated with a particular task. For example, in the case of FIG. 2, a mapping from a logical address, $addr_{log}$, to a physical address, $addr_{phys}$, may be determined as follows:

$$addr_{phys}[t][s][7:0]=addr_{log}[t][s][7:0]+\{remap[t][s][1:0],6'b0\}$$

where remap indicates a mapping value based on a task identifier, t, and a storage unit set identifier, s, and [1:0] indicates a 2-bit value per task per set of storage units that maps physical addresses in that set of storage units to a particular pre-defined portion (which is available for storing data). The task identifier is for example a 1-bit value, e.g. indicating whether the task is the first task or the second task (although the task identifier may be larger if more than two tasks are to use the storage at the same time). The storage unit set identifier for example indicates which set of storage units particular data is to be stored in, e.g. using a numerical value to indicate a given set of storage units. The 2-bit value in this example indicates the pre-defined portion (in this case, the quadrant) to which physical addresses for a particular set of storage units are to be mapped. For example, in FIG. 2, the logical addresses of the data generated during execution of the end of the first task do not undergo a mapping. In other words, the logical addresses remain associated with previously defined physical addresses in the storage 100, and are not mapped to different physical addresses. The 2-bit value in this case takes the value of 2'b00 for both the first and second set of storage units. The logical addresses of the data generated during execution of the beginning of the second task undergoes a mapping from the first pre-defined portion to the second pre-defined portion in the first set of storage units, represented by a 2-bit value of 2'b01, but does not undergo a mapping in the second set of storage units, represented by a 2-bit value of 2b'00. In this example, the mapping for the first set of storage units is into the first pre-defined portion that is indicated as being available (which in this case is the second pre-defined portion). However, in other examples, the mapping may be to a different pre-defined portion. A mapping as described herein may thus be considered to be a remapping, in which a logical address is associated with a different physical address than a previous physical address associated with the logical address.

In this example, the 2-bit value indicating the pre-defined portion (in this case, the quadrant) to which physical addresses for a particular set of storage units are to be mapped may be determined based on control logic for at least one task. For example, there may be first control logic for the first task, indicating that the physical addresses corresponding to the second to fourth buffers 106b-106d of the first set 102a of storage units and the first to third buffers 108a-108c, fifth buffer 108e and unused storage area 110 of the second set 102b of storage units are free to be written to during execution of the first task and/or indicating which of the pre-defined portions are free at a given time. A handling unit of the processor, such as a traversal synchronization unit (TSU), may use an iterator with an iterator state including an indicator (e.g. corresponding to the task identifier, t) specifying which task the iterator state belongs to, and thus which control logic or sets of control logic are to be used to identify the available portion of the storage. For example, in this case, upon starting execution of the first task, the first control logic may be used to identify the available portion of the storage for execution of the second task (which is to begin after the first task has commenced). Second control logic for the second task may then be used to keep track of usage of the storage during execution of the second task. The first and second control logic may both be used when a part of the first task is being executed at the same time as a part of the second task. After completion of the first task, the iterator state may then be allocated to the second task. The processor may be configured to implement a maximum of two tasks at the same time. In such cases, there may be two sets of control logic: primary control logic for a primary task and secondary control logic for a secondary task, which is e.g. a task that is commenced after the primary task. In these cases the iterator state may toggle between belonging to the primary task and the secondary task. However, in other cases, the processor may implement more than two tasks at least partly at the same time. In such cases, there may be more than two sets of control logic.

The methods herein may be used to process data of various types. For example, as explained above, the data generated during execution of a given task may be a tensor (where, as used herein, the term "tensor" is to be considered to refer to a multi-dimensional tensor). A tensor is an array of elements, such as an array of same-typed scalar elements. Various tasks may involve the processing and/or generation of tensors, such as neural network processing and graphics processing.

Figure 3:
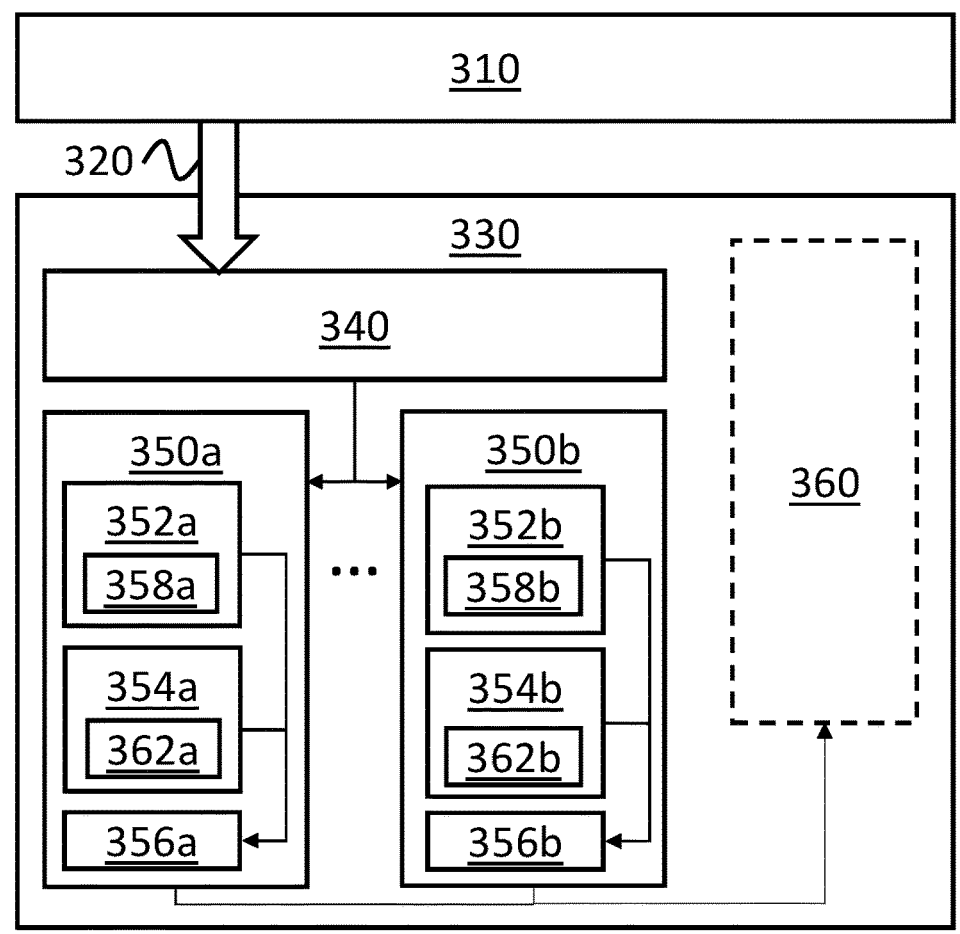
FIG. 3 is a schematic diagram of a data processing system according to examples.

The methods herein may be implemented using a processor that provides dedicated circuitry that can be used to perform operations which would normally be undertaken by dedicated hardware accelerators, such as a neural processing unit (NPU) and a graphics processing unit (GPU). FIG. 3 shows schematically an example of a data processing system 300 including such a processor 330. It will be appreciated that the types of hardware accelerator which the processor 330 may provide dedicated circuitry for is not limited to that of an NPU or GPU but may be dedicated circuitry for any type of hardware accelerator. GPU shader cores may be well-suited for performing certain types of arithmetic operations such as neural processing operations, as these operations are generally similar to the arithmetic operations that may be required when performing graphics processing work (but on different data). Furthermore, graphics processors typically support high levels of concurrent processing (e.g.

supporting large numbers of execution threads), and are optimized for data-plane (rather than control plane) processing, all of which means that graphics processors may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable, to utilize some of the GPU's existing resources (e.g. such that at least some functional units and resource of the GPU can effectively be shared between the different hardware accelerator circuitry, for instance), whilst still allowing an improved (more optimized) performance compared to performing all the processing with general purpose execution.

As such, the processor 330 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor, this means that the machine learning processing circuit is preferably then operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 3, the processor 330 is arranged to receive a command stream 320 from a host processor 310, such as a CPU. The command stream comprises at least one command in a given sequence, each command to be executed, and each command may be decomposed into a number of tasks, such as the tasks discussed in examples above. These tasks may be self-contained operations, such as a given machine learning operation or a graphics processing operation. It will be appreciated that there may be other types of tasks depending on the command.

The command stream 320 is sent by the host processor 310 and is received by a command processing unit 340 which is arranged to schedule the commands within the command stream 320 in accordance with their sequence. The command processing unit 340 is arranged to schedule the commands and decompose each command in the command stream 620 into at least one task. Once the command processing unit 340 has scheduled the commands in the command stream 320, and generated a plurality of tasks for the commands, the command processing unit issues each of the plurality of tasks to at least one compute unit 350a, 350b each of which are configured to process at least one of the plurality of tasks.

The processor 330 comprises a plurality of compute units 350a, 350b. Each compute unit 350a, 350b, may be a shader core of a GPU specifically configured to undertake a number of different types of operations, however it will be appreciated that other types of specifically configured processor may be used, such as a general-purpose processor configured with individual compute units, such as compute units 350a, 350b. Each compute unit 350a, 350b comprises a number of components, and at least a first processing module 352a, 352b for executing tasks of a first task type, and a second processing module 354a, 354b for executing tasks of a second task type, different from the first task type. In some examples, the first processing module 352a, 352b may be a processing module for processing neural processing operations, such as those which would normally be undertaken by a separate NPU. In these cases, the first processing module 352a, 352b is for example a neural engine. Similarly, the second processing module 354a, 354b may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader takes, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 340 issues tasks of a first task type to the first processing module 352a, 352b of a given compute unit 350a, 350b, and tasks of a second task type to the second processing module 354a, 354b of a given compute unit 350a, 350b. The command processing unit 340 would issue machine learning/neural processing tasks to the first processing module 352a, 352b of a given compute unit 350a, 350b where the first processing module 352a, 352b is optimized to process neural network processing tasks, for example by comprising an efficient means of handling a large number of multiply-accumulate operations. Similarly, the command processing unit 340 would issue graphics processing tasks to the second processing module 354a, 354b of a given compute unit 350a, 350b where the second processing module 352a, 354a is optimized to process such graphics processing tasks. In some examples, such as that described below with reference to FIG. 4, the first and second tasks referred to with reference to FIGS. 1a, 1b and 2 are both neural processing tasks issued to a first processing module 352a, 352b, which is a neural engine. Such a neural processing task may involve processing of a tensor, e.g. representing a feature map, with weights associated with a layer of a neural network.

In addition to comprising a first processing module 352a, 352b and a second processing module 354a, 354b, each compute unit 350a, 350b also comprises a memory in the form of a local cache 356a, 356b for use by the respective processing module 352a, 352b, 354a, 354b during the processing of tasks. Examples of such a local cache 356a, 356b is a L1 cache. The local cache 356a, 356b may, for example, a synchronous dynamic random-access memory (SDRAM). For example, the local cache 356a, 356b may comprise a double data rate synchronous dynamic random-access memory (DDR-SDRAM). It will be appreciated that the local cache 356a, 356b may comprise other types of memory.

The local cache 356a, 356b is used for storing data relating to the tasks which are being processed on a given compute unit 350a, 350b by the first processing module 352a, 352b and second processing module 354a, 354b. It may also be accessed by other processing modules (not shown) forming part of the compute unit 350a, 350b the local cache 356a, 356b is associated with. However, in some examples it may be necessary to provide access data associated with a given task executing on a processing module of a given compute unit 350a, 350b to a task being executed on a processing module of another compute unit (not shown) of the processor 330. In such examples, the processor 330 may also comprise storage 360, for example a cache, such as an L2 cache, for providing access to data use for the processing of tasks being executed on different compute units 350a, 350b.

By providing a local cache 356a, 356b tasks which have been issued to the same compute unit 350a, 350b may access data stored in the local cache 356a, 356b, regardless of whether they form part of the same command in the command stream 320. The command processing unit 340 is responsible for allocating tasks of commands to given compute units 350a, 350b such that they can most efficiently use the available resources, such as the local cache 356a, 356b, thus reducing the number of read/write transactions required to memory external to the compute units 350a, 350b, such as the storage 360 (L2 cache) or higher level memories. One such example, is that a task of one command issued to a first processing module 352a of a given compute unit 350a, may store its output in the local cache 356a such that it is accessible by a second task of a different (or the same) command issued to a given processing module 352a, 354a of the same compute unit 350a.

The first processing module 352a, 352b has internal storage 358a, 358b, which is for example a buffer for storing data internally to the first processing module 352a, 352b during performance of a task by the first processing module 352a, 352b. The second processing module 354a, 354b similarly has internal storage 362a, 362b, which is also for example a buffer. The storage for which at least one physical address corresponding to at least one logical address is to be determined according to examples herein is for example one of the internal storages 358a, 358b, 362a, 362b.

One or more of the command processing unit 340, the compute units 350a, 350b, and the storage 360 may be interconnected using a bus. This allows data to be transferred between the various components. The bus may be or include any suitable interface or bus. For example, an ARM® Advanced Microcontroller Bus Architecture (AMBA®) interface, such as the Advanced eXtensible Interface (AXI), may be used.

Figure 4:
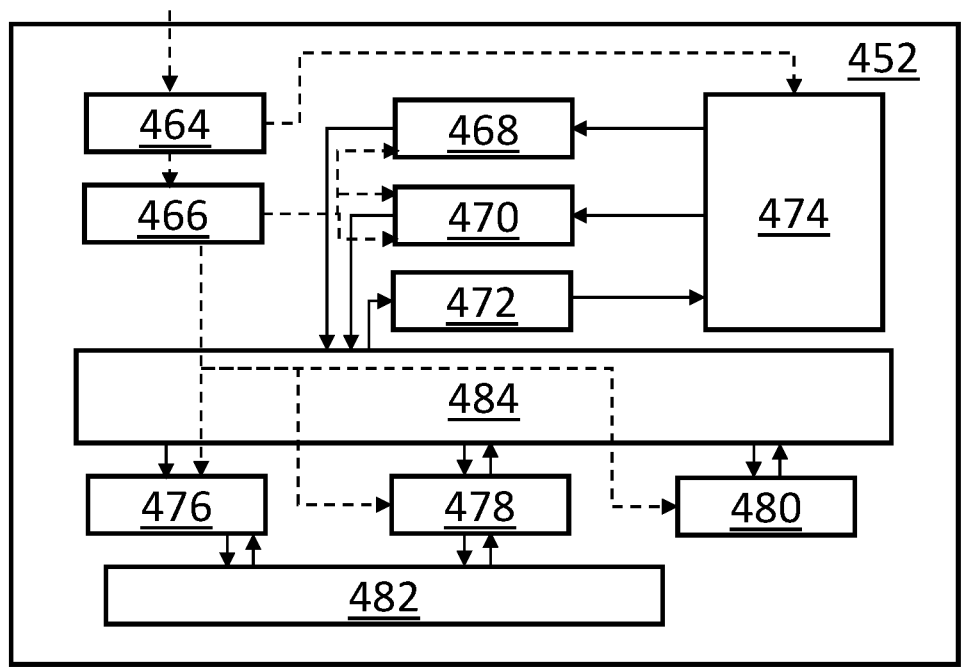
FIG. 4 is a schematic diagram of a neural engine according to examples.

FIG. 4 is a schematic diagram of a neural engine 452, which in this example is used as a first processing module 352a, 352b in a data processing system 300 in accordance with FIG. 3. The neural engine 452 includes a command and control module 464. The command and control module 464 receives tasks from the command processing unit 340 (shown in FIG. 3), and also acts as an interface to storage external to the neural engine 452 (such as a local cache 356a, 356b and/or a L2 cache 360) which is arranged to store data to be processed by the neural engine 452 such as data representing a tensor, or data representing a stripe of a tensor. The external storage may additionally store other data to configure the neural engine 452 to perform particular processing and/or data to be used by the neural engine 452 to implement the processing such as neural network weights.

The command and control module 464 interfaces to a handling unit 466, which is for example a traversal synchronization unit (TSU). In this example, each task corresponds to a stripe of a tensor, which is to be convolved with weights to implement a layer of a neural network. The tensor for example represents a feature map for processing using the neural network. A neural network typically includes a sequence of layers of processing, with an output from each layer being used as an input to the next layer. Each layer for example processes an input feature map by convolving the input feature map with a set of weights to generate an output feature map, which is used as the input feature map for the next layer. The term "feature map" is used generically herein to refer to either an input feature map or an output feature map. The processing performed by a given layer may be taken to correspond to an operation as described with reference to FIGS. 1a, 1b and 2.

In this example, the handling unit 466 splits data representing a stripe of a tensor into a plurality of blocks of data, each of which represents a respective part of the tensor. The handling unit 466 also obtains, from storage external to the neural engine 452 such as the L2 cache 360, an operation set comprising a plurality of operations. In this example, the operations are a chain of operations, representing a sequence of layers of the neural network. A block of data is allocated as an input to one of the operations by the handling unit 466.

The handling unit 466 coordinates the interaction of internal components of the neural engine 452, which include a weight fetch unit 468, an input reader 470, an output writer 472, a direct memory access (DMA) unit 474, a dot product unit (DPU) array 476, a vector engine 478, a transform unit 480, an accumulator buffer 482, and a storage 484, for processing of blocks of data. The data dependencies across the functional units are tracked by the handling unit 466. Processing is initiated by the handling unit 466 in a functional unit if all input blocks are available and space is available in the storage 484 of the neural engine 452. The storage 484 may be considered to be a shared buffer, in that various functional units of the neural engine 452 share access to the storage 484.

The weight fetch unit 468 fetches weights associated with the neural network from external storage and stores the weights in the storage 484. The input reader 470 reads data to be processed by the neural engine 452 from external storage, such as a block of data representing part of a tensor. The output writer 472 writes data obtained after processing by the neural engine 452 to external storage, such as a block of data representing part of an output feature map obtained by processing a corresponding part of an input feature map by the neural network represented by the weights fetched by the weight fetch unit 468. The weight fetch unit 468, input reader 470 and output writer 472 interface with the external storage (which is for example the local cache 356a, 356b, which may be a L1 cache such as a load/store cache) via the DMA unit 474.

The weights and block(s) of data are processed by the DPU array 476, vector engine 478 and transform unit 480 to generate output data which is written out to the external storage by the output writer 472. The DPU array 476 is arranged to efficiently calculate a dot product between two operands, such as between an array of weights and a corresponding block of data (e.g. representing part of a tensor). The vector engine 478 is arranged to perform elementwise operations, for example to apply scale parameters to scale an output of a dot product calculated by the DPU array 476. Data generated during the course of the processing performed by the DPU array 476 and the vector engine 478 is stored temporarily in the accumulator buffer 482, from where it may be retrieved by either the DPU array 476 or the vector engine 478 for further processing as desired.

The transform unit 480 is arranged to perform in-block transforms such as dimension broadcasts or axis swaps. The transform unit 480 obtains data from the storage 484 (e.g. after processing by the DPU array 476 and/or vector engine 478) and writes transformed data back to the storage 484.

To make efficient use of the storage 484 available within the neural engine 452, the handling unit 466 determines an available portion of the storage 484, which is available during execution of part of a first task (e.g. during processing of a block of data associated with the first task by the DPU array 476, vector engine 478 and/or transform unit 480). The handling unit 466 determines a mapping between at least one logical address associated with data generated during execution of a second task (e.g. by processing of a block of data associated with the second task by the DPU array 476, vector engine 478 and/or transform unit 480) and at least one physical address of the storage 484 corresponding to the available portion. The logical address is for example a global address in a global coordinate system. Hence, by altering the physical address corresponding to a given logical address, the handling unit 466 can effectively control usage of the storage 484 without requiring a change in software defining the operation to be performed, as the same logical address can still be used to refer to a given element of the tensor to be processed. The handling unit 466 identifies the at least one physical address corresponding to the at least one logical address, based on the mapping, so that data associated with the logical address is stored in the available portion. The handling unit 466 can perform the mapping process according to any of the examples herein.

Figure 5:
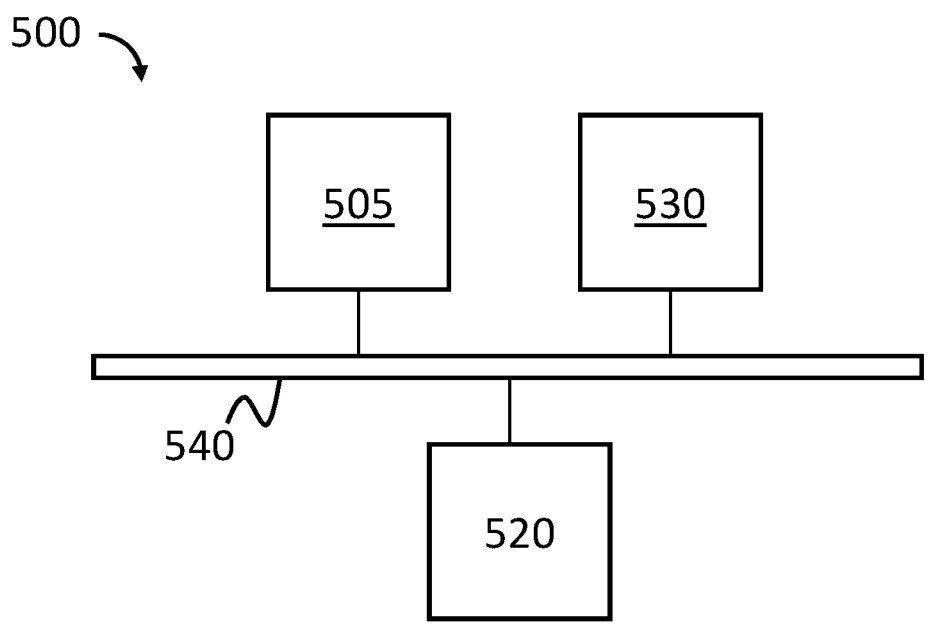
FIG. 5 is a schematic diagram of a system comprising features according to examples.

FIG. 5 shows schematically a system 500 for allocating tasks associated with commands in a sequence of commands.

The system 500 comprises host processor 505 such as a central processing unit, or any other type of general processing unit. The host processor 505 issues a command stream comprising a plurality of commands, each having a plurality of tasks associated therewith.

The system 500 also comprises a processor 530, which may be similar to or the same as the processor 330 of FIG. 3. The processor 530 comprises at least a plurality of compute units 350a, 350b and a command processing unit 340. Each compute unit may comprise a plurality of processing modules each configured to perform at least one type of operation. The system 500 may also include at least one further processor (not shown), which may be the same as the processor 530. The processor 530, and the host processor 505 may be combined as a System on Chip (SoC) or onto multiple SoCs to form one or more application processors.

The system 500 also comprises memory 520 for storing data generated by the tasks externally from the processor 530, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 350a, 350b of a processor 530 so as to maximize the usage of the local cache 356a, 356b.

In some examples, the system 500 may comprise a memory controller (not shown), which may be a dynamic memory controller (DMC). The memory controller is coupled to the memory 520. The memory controller is configured to manage the flow of data going to and from the memory. The memory may comprise a main memory, otherwise referred to as a 'primary memory'. The memory may be an external memory, in that the memory is external to the system 500. For example, the memory 520 may comprise 'off-chip' memory. The memory may have a greater storage capacity than local caches of the processor 530 and/or the host processor 505. In some examples, the memory 520 is comprised in the system 500. For example, the memory 520 may comprise 'on-chip' memory. The memory 520 may, for example, comprise a magnetic or optical disk and disk drive or a solid-state drive (SSD). In some examples, the memory 520 comprises a synchronous dynamic random-access memory (SDRAM). For example, the memory 520 may comprise a double data rate synchronous dynamic random-access memory (DDR-SDRAM).

One or more of the host processor 505, the processor 530, and the memory 520 may be interconnected using a system bus 540. This allows data to be transferred between the various components. The system bus 540 may be or include any suitable interface or bus. For example, an ARM® Advanced Microcontroller Bus Architecture (AMBA®) interface, such as the Advanced eXtensible Interface (AXI), may be used.

The above examples are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A processor to execute a plurality of tasks, the plurality of tasks comprising:
a first task; and
a second task, wherein at least a part of the first task is to be executed simultaneously with at least a part of the second task,
the processor comprising:
a handling unit to:
determine an available portion of a storage available during execution of the part of the first task;
determine a mapping between at least one logical address associated with data associated with execution of the part of the second task and a corresponding at least one physical address of the storage corresponding to the available portion; and
identify, based on the mapping, the at least one physical address corresponding to the at least one logical address associated with the data, for storing the data in the available portion of the storage.

2. The processor according to claim 1, wherein the part of the first task is an end of the first task and the part of the second task is a beginning of the second task.

3. The processor according to claim 1, wherein the storage comprises a plurality of pre-defined portions, and the handling unit is to determine which of the pre-defined portions is available for use as the available portion based on availability data indicative of an availability of each of the plurality of pre-defined portions during execution of the part of the first task.

4. The processor according to claim 3, wherein the storage comprises a plurality of storage units, and each of the plurality of pre-defined portions corresponds to a respective range of physical addresses of a set of the storage units.

5. The processor according to claim 4, wherein the available portion corresponds to a first range of physical addresses for a first set of the storage units and a second range of physical addresses, different from the first range of physical addresses, for a second set of the storage units, different from the first set of the storage units.

6. The processor according to claim 3, wherein the at least one physical address corresponds to less than all of at least one of the pre-defined portions.

7. The processor according to claim 1, wherein the mapping is further based on a task identifier associated with the data, indicative that the data is associated with the second task.

8. The processor according to claim 1, wherein the first task comprises a first set of operations and the second task comprises a second set of operations, at least one of the first set of operations and the second set of operations comprising at least two operations to be executed simultaneously by the processor.

9. The processor according to claim 8, wherein the handling unit is to segment the storage to store a respective output of each of the at least two operations in different respective segments of the storage.

10. The processor according to claim 9, wherein the available portion comprises a respective part of each of the segments of the storage.

11. The processor according to claim 1, wherein the data represents at least part of a multi-dimensional tensor.

12. The processor according to claim 11, wherein the processor comprises a neural engine to process at least the part of the multi-dimensional tensor, and the storage is local storage of the neural engine.

13. The processor according to claim 1, wherein the handling unit is to toggle between use of at least primary control logic and secondary control logic for determining an available portion of the storage over time, wherein the primary control logic is associated with a primary task and is indicative of a first usage of the storage during execution of at least part of the primary task, and the secondary control logic is associated with a secondary task to be executed at least partly simultaneously with the primary task and is indicative of a second usage of the storage during execution of at least part of the secondary task.

14. A method performed by a processor, the method comprising:
    determining an available portion of a storage available during execution of a part of a first task;
    determining a mapping between at least one logical address associated with data associated with execution of a part of a second task and a corresponding at least one physical address of the storage corresponding to the available portion, wherein at least the part of the first task is to be executed simultaneously with at least the part of the second task; and
    identifying, based on the mapping, the at least one physical address corresponding to the at least one logical address associated with the data, for storing the data in the available portion of the storage.

15. The method according to claim 14, wherein the part of the first task is an end of the first task and the part of the second task is a beginning of the second task.

16. The method according to claim 14, wherein the storage comprises a plurality of pre-defined portions, and the method comprises determining which of the pre-defined portions is available for use as the available portion based on availability data indicative of an availability of each of the plurality of pre-defined portions during execution of the part of the first task.

17. The method according to claim 16, wherein the storage comprises a plurality of storage units, each of the plurality of pre-defined portions corresponds to a respective range of physical addresses of a set of the storage units.

18. The method according to claim 17, wherein the available portion corresponds to a first range of physical addresses for a first set of the storage units and a second range of physical addresses, different from the first range of physical addresses, for a second set of the storage units, different from the first set of the storage units.

19. A non-transitory computer-readable storage medium comprising a set of computer-readable instructions stored thereon which, when executed by at least one processor, are arranged to cause the at least one processor to:
    determine an available portion of a storage available during execution of a part of a first task, wherein the storage is accessible to the at least one processor;
    determine a mapping between at least one logical address associated with data associated with execution of a part of a second task and a corresponding at least one physical address of the storage corresponding to the available portion, wherein at least the part of the first task is to be executed simultaneously with at least the part of the second task; and
    identify, based on the mapping, the at least one physical address corresponding to the at least one logical address associated with the data, for storing the data in the available portion of the storage.

20. The non-transitory computer-readable storage medium according to claim 19, wherein the storage comprises a plurality of pre-defined portions and the set of computer-readable instructions stored thereon are arranged to, when executed by at least one processor, cause the at least one processor to determine which of the pre-defined portions is available for use as the available portion based on availability data indicative of an availability of each of the plurality of pre-defined portions during execution of the part of the first task.

* * * * *